United States Patent
Guertler et al.

(10) Patent No.: US 7,013,225 B2
(45) Date of Patent: Mar. 14, 2006

(54) METHOD FOR DETERMINING THE AMOUNT OF AN OPERATING MEDIUM IN A MOTOR VEHICLE

(75) Inventors: Thomas Guertler, Stuttgart (DE); Hartwig Hellwig, Stuttgart (DE); Klaus Land, Schlierbach (DE); Harald Ott, Sachsenheim (DE); Martin-Kai Riedel, Nuertingen (DE)

(73) Assignee: DaimlerChrysler AG, Stuttgart (DE)

( * ) Notice: Subject to any disclaimer, the term of this patent is extended or adjusted under 35 U.S.C. 154(b) by 121 days.

(21) Appl. No.: 10/467,526

(22) PCT Filed: Dec. 22, 2001

(86) PCT No.: PCT/EP01/15294

§ 371 (c)(1),
(2), (4) Date: Feb. 3, 2004

(87) PCT Pub. No.: WO02/065065

PCT Pub. Date: Aug. 22, 2002

(65) Prior Publication Data

US 2004/0122603 A1 Jun. 24, 2004

(30) Foreign Application Priority Data

Feb. 9, 2001 (DE) ................ 101 05 889

(51) Int. Cl.
*G01F 17/00* (2006.01)
(52) U.S. Cl. .................... 702/55; 702/50; 702/100; 73/291; 701/29
(58) Field of Classification Search ............ 702/50, 702/55, 100; 73/291, 292, 290 R, 117.3; 701/29
See application file for complete search history.

(56) References Cited

U.S. PATENT DOCUMENTS 2,948,272 A * 8/1960 Woodward et al. ......... 123/478
6,577,959 B1 * 6/2003 Chajec et al. ................ 702/50

FOREIGN PATENT DOCUMENTS

| DE | 40 42 472 C2 | 12/1990 |
| DE | 196 02 599 | 1/1996 |
| EP | 1 063 498 A2 | 12/2000 |
| FR | 2 808 085 | 4/2000 |
| JP | 04-310824 | 11/1992 |
| JP | 09-068453 | 3/1997 |

* cited by examiner

*Primary Examiner*—Michael Nghiem
*Assistant Examiner*—Stephen J Cherry
(74) *Attorney, Agent, or Firm*—Crowell & Moring LLP

(57) ABSTRACT

The invention relates to a method for determining the fill quantity of an operating medium, in particular of the engine oil in a motor vehicle having a reservoir container of the operating medium and having a data processing device for determining the fill quantity of the operating medium. A fill level sensor for sensing the fill level is arranged in the reservoir container for the operating medium. In order to determine the fill level of the operating medium, operating states of the vehicle such as the temperature of the operating medium and the engine speed are also sensed. According to the invention, a characteristic variable for the engine load, for example the position of the accelerator pedal, the throttle valve position or the torque on the drive train are sensed. The fill quantity of the operating medium is determined from the sensed data by a data processing device.

9 Claims, 1 Drawing Sheet

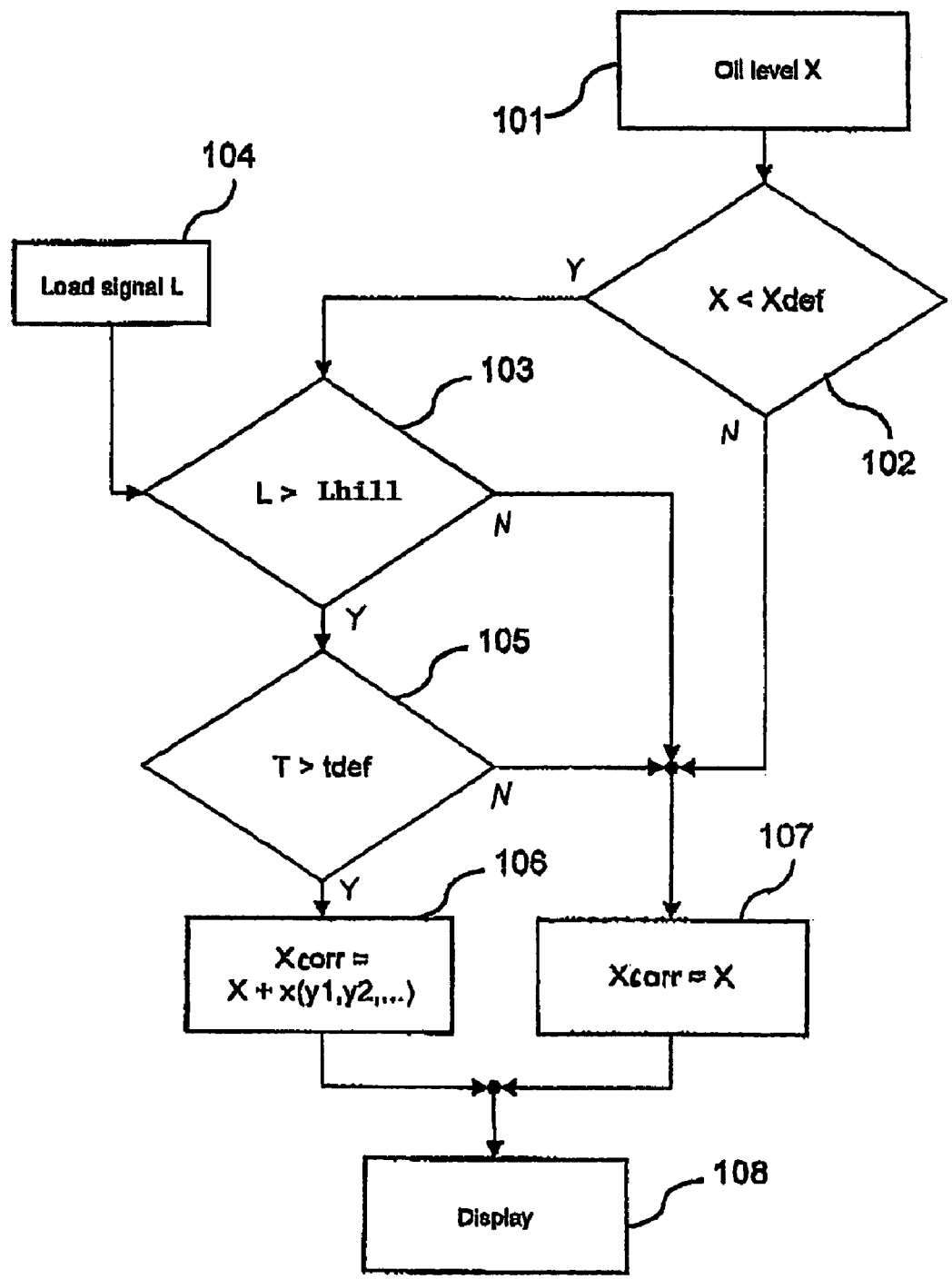

though very complex sensors are necessary to carry out this method.

METHOD FOR DETERMINING THE AMOUNT OF AN OPERATING MEDIUM IN A MOTOR VEHICLE

BACKGROUND AND SUMMARY OF THE INVENTION

This application claims the priority of German patent document 101 05 889.6, filed 9 Feb. 2001 (PCT International Application No. PCT/EP01/15294, filed 22 Dec. 2001), the disclosure of which is expressly incorporated by reference herein.

The invention relates to a method for determining the fill quantity of an operating medium, such as engine oil, in a motor vehicle.

German patent document DE 19602599 A1 discloses a method for determining a quantity of fluid (in particular the quantity of engine oil) in a motor vehicle. The fill level of the fluid, which is sensed by means of the fill level sensor, fluctuates as a function of the driving state, which adversely affects the determination of the quantity of fluid. In order to reduce the influence of the fluctuations in the fill level, which occur in particular in the driving mode, variables that are indicative of the driving state are sensed and used to determine the instantaneous driving state. The fill level of the fluid is then sensed during selected driving states, and is used to determine the fill quantity of the fluid. This determination is carried out by reference to a known dependence of the fill level of the fluid on the fill quantity of the fluid and on the driving state.

A precondition for the start of the method is that the temperature of the fluid and the ignition status of the speed satisfy fixed conditions. The sensed fill level value is filtered digitally, as a result of which brief fluctuations in the fill level are eliminated. Furthermore, when the quantity of engine oil is determined, the engine speed is taken into account. Further variables, such as the speed of the vehicle, the temperature and the mileage reading can also be taken into account in the determination of the quantity of engine oil; moreover, statistical averaging of the measured values further increases the reliability of the determination of a quantity of fluid.

If the vehicle is inclined (for example due to uphill travel), the fluid reservoir container is inclined to the same degree and a fluid level which frequently differs from the fluid level of a horizontal vehicle is obtained on the fill level sensor, depending on the location where the fill level sensor is installed. If the quantity of fluid is determined from the measured fluid level without taking into account the angular position of the vehicle, an incorrect result may be obtained.

German patent document DE 40 42 472 C2 discloses an arrangement for determining the quantity of engine oil by measuring the engine oil level and measuring the angular position of the vehicle. For each predefined quantity of engine oil there is a uniquely defined relationship between the angular position of the vehicle and the oil level in the engine, which is utilized to infer the quantity of engine oil. The angular position of the vehicle is sensed using an angle measuring device, and the quantity of engine oil is calculated by means of a data processing device using the angular position of the vehicle. The actual angular position and/or measured angular position of the vehicle relate to the gravity field of the earth. The two variables, inclination of a vehicle and the gradient (longitudinal inclination) of a road, also relate to this, moreover.

In another method for determining the fill quantity of the operating medium, the fill level of the operating medium is sensed at two or more locations in the reservoir container of the operating medium. Even when the angular position of the vehicle is unknown, the fill quantity can be calculated from the sensed fill levels, since the fill levels for each angular position are in a fixed relationship to one another which depends on the location where the fill level sensors are mounted and on the geometry of the reservoir container. However, in order to carry out this method at least two fill level sensors are necessary. Using two fill level sensors it is possible to determine the angular position of the vehicle in the direction of the line connecting the two sensors. Furthermore, using three or more fill level sensors which are not arranged in a row it is possible to determine the angular position of the vehicle in any desired direction, that is to say even in the direction of the longitudinal axis of the vehicle and transversely with respect to the longitudinal axis of the vehicle.

One object of the present invention is to provide an improved method for determining the fill quantity of the operating medium, using only one fill level sensor.

This and other objects and advantages are achieved by the method according to the invention, in which the sensed fill level of the operating medium is corrected by means of a plurality of parameters that are used by a data processing device to determine the fill quantity of the operating medium. A fill level sensor is provided for sensing the fill level in the reservoir container of the operating medium. Operating states of the vehicle are sensed as further parameters and made available to the data processing system. Examples of these operating states are the temperature of the operating medium and the engine speed.

In order to correct the influence of the instantaneous road gradient on the sensed engine oil level, a parameter is sensed which constitutes a measure of the gradient (longitudinal inclination) of the road. The engine load, for example, becomes larger when traveling uphill as the gradient increases, and decreases when traveling downhill as the gradient increases. According to the invention, the gradient of the road is inferred from a characteristic variable for the engine load, and the engine oil level is corrected by means of the gradient of the road. In order to supplement the engine load parameter, vehicle-movement-dynamic variables may be used which give an indication of the gradient of the road traveled on. An advantage of the method according to the invention is that the fill quantity of the operating medium is determined more precisely and reliably without additional expenditure on sensors.

In one refinement of the method, the position of the accelerator pedal is sensed as the characteristic variable for the engine load, which is used to determine the fill quantity of the operating medium. Accelerator pedal position is a variable which acts directly on the power generation of the engine and is thus characteristic of the load of the engine. Moreover, it is also already available as a signal on a data bus.

In another refinement of the method, the throttle valve position is used as the characteristic variable for the engine load. In many vehicles, this variable is also available on a data bus in the vehicle.

In an alternative refinement of the method, a physical variable such as force, torque or power on the drive train (that is, between the engine and the wheel), is sensed as the characteristic variable for the engine load. Such a variable is a direct measure of the engine load.

The method according to the invention can be used in particular to determine the fill quantity of fluids in reservoir containers in the vehicle, for example gear oil, brake fluid, coolant or fuel.

Other objects, advantages and novel features of the present invention will become apparent from the following detailed description of the invention when considered in conjunction with the accompanying drawings.

BRIEF DESCRIPTION OF THE DRAWINGS

The single FIGURE is a flow chart that illustrates the steps performed in the method according to the invention.

DETAILED DESCRIPTION OF THE DRAWINGS

The FIGURE shows a flowchart of an advantageous embodiment of the method in a schematic illustration. The fill level is related to the fill quantity in a uniquely defined way; as a result, the fill quantity can be determined from the fill level, for example by means of a functional relationship using a characteristic curve or a table. An improved determination of the fill quantity of an operating medium can thus be achieved by means of an improved determination of the fill level of the operating medium. As used herein, the determined fill level refers to a value that corresponds to a fill level measured under predetermined conditions, and may vary from the actually measured fill level. A corrected fill level Xcorr, which is determined from a fill level X by means of the illustrated embodiment of the method, corresponds more closely to the actual fill quantity than the fill level X.

The method according to the invention is started as a function of predefinable starting conditions. The latter relate, for example, to the temperature of the operating medium, the speed of the vehicle, the engine speed, the engine ignition status, the status of electrical loads, transverse longitudinal acceleration of the vehicle, and the vehicle yaw rate. These parameters may be included not only in the starting conditions but also in abort conditions for the method according to the invention.

In addition to the starting and abort conditions, conditions for sensing measured values may also be predefined. If these conditions are not fulfilled, either measured values are not sensed or the sensed measured values are not used to determine the fill quantity of the operating medium. The same parameters can be included in the conditions for the sensing of measured values as in the starting conditions.

The flowchart shown in the FIGURE is selected for the case of downhill travel, and the fill level sensor is arranged such that during downhill travel (that is, when the vehicle is inclined to the rear), the fill level of the operating medium at the fill levels sensor is lower.

In method step 101, the fill level X is read in. The fill level X is a value which is obtained from processing the value which is sensed by the fill level sensor. For example, the fill level X can be obtained from the sensed fill level by filtering using a low-pass filter, or the value X may be a chronologically averaged value of the fill level sensed by the fill level sensor.

In the interrogation 102 it is checked whether the fill level X is lower than a predefined value Xdef. If so, in step 103 it is checked whether the load signal L (a characteristic variable for engine load) read out from a data bus of the vehicle in step 104, is larger than a predefinable value Lhill. The latter value depends in particular on the geometry of the operating medium reservoir container and on the location where the fill level sensor is mounted. That is, given a geometry of the operating medium reservoir container with a strong change in the fill level at the fill level sensor even on small gradients, the value Lhill is selected to be smaller, whereas given a geometry of the operating medium reservoir container in which the gradient of the uphill travel has only a small influence at the fill level on the fill level sensor, a relatively large value for Lhill is predefined.

If the load signal L in step 103 is greater than the predefined value Lhill105 it is determined in step 105 whether the two conditions 102 and 103 have been satisfied (that is, the fill level X being lower than a predefined fill level Xdef, and the characteristic signal for the engine load L being larger than a predefined threshold value Lhill) for at least a time period T which is greater than a predefinable time period tdef. If so, in step 106 the fill level X is corrected by adding a value x to the fill level X.

A gradient of the road and an acceleration process have the same physical effect, due to the identity of inertial mass and gravitational mass. However, while uphill travel can have relatively long gradients which change little, acceleration processes with a virtually constant acceleration of the vehicle rarely last longer than 10 or 20 seconds. The combined effect of the steps 103 and 105 thus corresponds to indirect checking to determine whether the gradient of the road is greater than a predefined gradient because short acceleration processes are eliminated by the time interrogation 105, if, for example, tdef=15 s is selected.

The correction of the fill level in step 106 can take the form of a simple addition of a constant correction value. Alternatively, the correction term may also be a function of other parameters (yi), for example the gradient, the load, the operating medium temperature or the vehicle load.

If one of the conditions 102, 103 and 105 is not fulfilled (that is, if the fill level X is larger than a predefined value Xdef, if the load signal L is smaller than the predefined value Lhill or if the two conditions are not fulfilled for at least one predefined time period tdef), the system branches to step 107, and the fill level X is left unchanged; that is, the corrected fill level Xcorr is equal to the fill level X. The fill level Xcorr, or the fill quantity which is determined from Xcorr, is indicated in step 108. Alternatively, or in addition, the corrected fill level Xcorr or the fill quantity calculated therefrom can be made available for further processing.

In a more complex embodiment of the method, a plurality of thresholds are predefined for the fill level X, the load L and the time t, and different correction terms x are added to the fill level X as a function of the exceeded thresholds. A functional relationship between the parameters X, L, t and x can also be predefined in order to correct the fill level X.

The method for determining the fill quantity of the operating medium illustrated in the FIGURE is changed, in the event of uphill travel in step 103, to the effect that the sign of the interrogation is reversed and a different value is predefined for Lhill. In addition, given the same arrangement of the fill level sensor (that is, at the rear of the filling trough), the sign in step 102 is reversed and a different value Xdef can be predefined.

If the fill level sensor is arranged at the front of the reservoir container of the operating medium, the sign is reversed in step 102 in comparison with the same cases with an arrangement of the fill level sensor in the rear region of the reservoir container.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for determining a fill quantity of an operating fluid contained in a reservoir in a motor vehicle, comprising:
   sensing a fill level of said fluid in said reservoir;
   sensing a characteristic variable that is indicative of an instantaneous engine load for said vehicle;
   correcting said sensed fill level as a function of said characteristic variable; and
   determining said fill quantity of said fluid as a function of corrected fill level;
   wherein said step of correcting said sensed fill level comprises, determining an instantaneous road gradient for a road on which said vehicle is operated, as a function of said characteristic variable; and
   correcting said sensed fill level data as a function of said determined instantaneous road gradient.

2. The method according to claim 1, wherein said characteristic variable comprises a quantity selected from the group consisting of a force applied to a drive train of the vehicle, a torque applied to the drive train, and a power level applied to the drive train.

3. The method according to claim 2, wherein said correcting step is performed only when both of the following conditions have been satisfied for at least a predetermined time period:
   i) the sensed fill level is above or below a predetermined range; and
   ii) the sensed variable exceeds a predetermined threshold value.

4. The method according to claim 3, wherein said correcting of said sensed fill level comprises adding to the sensed fill level, a correction amount which is a function of said variable.

5. A method for determining the fill quantity of an operating medium in a motor vehicle having a reservoir container for the operating medium, a fill level sensor for sensing the fill level in the reservoir container, and a data processor for determining the fill quantity of the operating medium, said method comprising:
   sensing the fill level of the operating medium and operating states of the vehicle; and
   the data processor determining the fill quantity of the operating medium from the sensed data; wherein,
   a characteristic variable indicative of engine load is sensed;
   the sensed characteristic variable is used in determining the fill quantity of the operating medium; and
   a quantity selected from the group consisting of a force applied to a drive train of the vehicle, a torque applied to the drive train, and a power level applied to the drive train, is sensed as the characteristic variable indicative of the engine load, and is used to determine the fill quantity of the operating medium.

6. A method for determining the fill quantity of an operating medium in a motor vehicle having a reservoir container for the operating medium, a fill level sensor for sensing the fill level in the reservoir container, and a data processor for determining the fill quantity of the operating medium, said method comprising:
   sensing fill level data indicative of the fill level of the operating medium, and operating state data indicative of operating states of the vehicle;
   determining an instantaneous engine load status for said vehicle;
   using said engine load status to determine an inclination of said vehicle;
   correcting said sensed fill level data based on said determined inclination; and
   the data processor determining the fill quantity of the operating medium based on the sensed operating state and the corrected fill level data.

7. The method according to claim 6, wherein:
   said step of determining an instantaneous engine load includes sensing a characteristic variable indicative of engine load; and
   said step of correcting said sensed fill level data comprises,
      determining an instantaneous raod gradient for a road on which said vehicle is operated, as a function of said characteristic variable; and
      correcting said sensed fill level data as a function of said determined instantaneous road gradient.

8. The method for determining fill quantity of an operating medium in a motor vehicle as claimed in claim 7, wherein accelerator pedal position is sensed as the characteristic variable indicative of engine load and is used to correct the sensed fill level of the operating medium.

9. The method for determining fill quantity of an operating medium in a motor vehicle as claimed in claim 7, wherein the throttle valve position is sensed as the characteristic variable indicative of engine load, and is used to correct the sensed fill level of the operating medium.

* * * * *